(12) United States Patent
Khoshnevisan et al.

(10) Patent No.: US 8,738,627 B1
(45) Date of Patent: May 27, 2014

(54) ENHANCED CONCEPT LISTS FOR SEARCH

(75) Inventors: Cyrus Khoshnevisan, Mercer Island, WA (US); Michael Paul Touloumtzis, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 589 days.

(21) Appl. No.: 12/814,519

(22) Filed: Jun. 14, 2010

(51) Int. Cl.
*G06F 7/00* (2006.01)
*G06F 17/30* (2006.01)
(52) U.S. Cl.
CPC .... *G06F 17/30864* (2013.01); *G06F 17/30873* (2013.01)
USPC ............................ 707/738; 707/722; 707/731
(58) Field of Classification Search
CPC ...................... G06F 17/30864; G06F 17/30873
USPC .......................................... 707/722, 731, 738
See application file for complete search history.

(56) References Cited

U.S. PATENT DOCUMENTS

| | | | |
|---|---|---|---|
| 8,214,360 B2* | 7/2012 | Arellanes et al. | 707/731 |
| 2005/0022106 A1* | 1/2005 | Kawai et al. | 715/500 |
| 2005/0102251 A1* | 5/2005 | Gillespie | 707/1 |
| 2006/0122991 A1* | 6/2006 | Chandrasekar et al. | 707/3 |
| 2008/0172362 A1* | 7/2008 | Shacham et al. | 707/3 |
| 2008/0172374 A1* | 7/2008 | Wolosin et al. | 707/5 |
| 2010/0257018 A1* | 10/2010 | Nagarajan | 705/10 |

* cited by examiner

*Primary Examiner* — Cheyne D Ly
(74) *Attorney, Agent, or Firm* — Thomas Horstemeyer LLP

(57) ABSTRACT

Disclosed are various embodiments providing an enhanced concept list for browsing within item search results. A pool of items is generated in a computing device in response to a search query. A plurality of relevant concepts is determined. The relevant concepts are those relevant to the search query. At least one network page is encoded for rendering by a client. The at least one network page includes a concept list and at least a portion of a plurality of items. The items in the plurality of items are responsive to the search query. The concept list corresponds to the plurality of relevant concepts. Each of the relevant concepts in the concept list operates to limit a view of the plurality of relevant items to items located in the respective relevant concept.

23 Claims, 5 Drawing Sheets

ENHANCED CONCEPT LISTS FOR SEARCH

BACKGROUND

Online shoppers interact with product search engines to find products of interest and obtain information about those products. The product search engine returns summary information for products that most closely match a user's search query. The user then selects a link associated with one of the search results to get more information about a product. Some electronic commerce sites also include a product catalog, or taxonomy. In addition to using the product search engine, a user can navigate through this hierarchical catalog to obtain information about products.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to providing an enhanced concept list for browsing within item search results generated by an item search engine. Each item within the search results is associated with, or belongs to, one or more concepts. In some embodiments, the initial search results that are presented to the user include all results matching the query. In such embodiments, the initial search results are not constrained by any of the concepts. In other embodiments, one of these concepts is preselected in the enhanced concept list, so that the user views items in that concept without having to first select a concept. In such embodiments, the preselected concept is the most relevant concept. The enhanced concept list also includes lower-level concept information (e.g., "Camera and Photo") along with the search results, allowing the user to better understand the relevance of the search results. The embodiments disclosed herein also capture behavior data as user interaction with search results, concepts, and items. Associations between a search query and the concepts and items eventually selected by a user are used to learn which specific lower-level concepts are considered relevant to that search query. For example, for a search query of "paper," if more users view camera paper than view a magazine titled "Paper Crafts," then the association between the search query of "paper" and the lower-level concept "Camera and Photo" will be strengthened, while the association between "paper" and "Magazines" will be weakened. In the following discussion, a general description of the system and its components is provided, followed by a discussion of the operation of the same.

Figure 1:
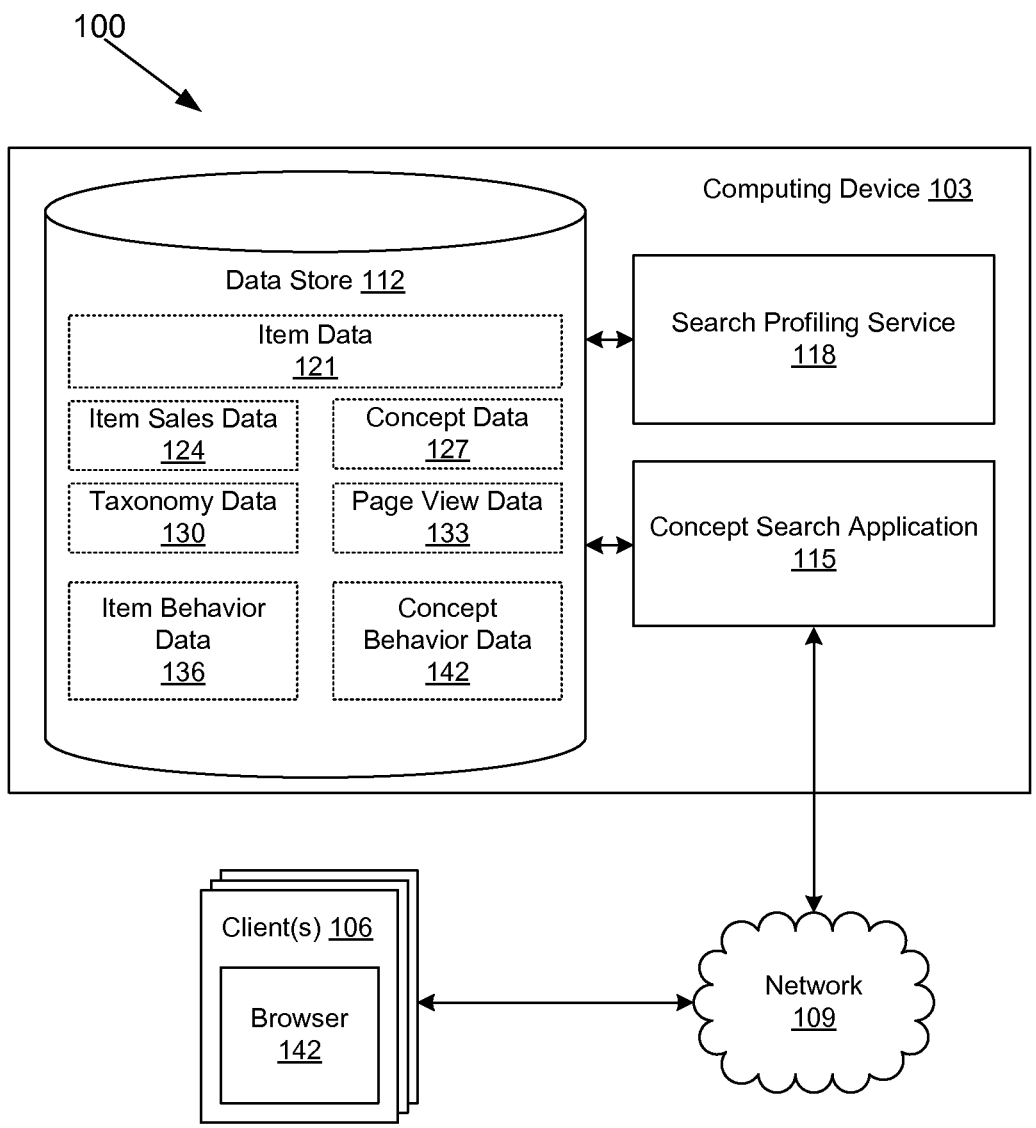
FIG. 1 is a drawing of a networked environment according to various embodiments of the present disclosure.

With reference to FIG. 1, shown is a networked environment 100 according to various embodiments. The networked environment 100 includes a computing device 103 that is in data communication with one or more clients 106 by way of a network 109. The network 109 may include, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. To this end, a plurality of computing devices 103 together may comprise, for example, a cloud computing resource, a grid computing resource, and/or any other distributed computing arrangement. Such computing devices 103 may be located in a single installation or may be dispersed among many different geographical locations. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 112 that is accessible to the computing device 103. The data store 112 may be representative of a plurality of data stores 112 as can be appreciated. The data stored in the data store 112, for example, is associated with the operation of the various applications and/or functional entities described below.

The components executed on the computing device 103, for example, include a concept search application 115, a search profiling service 118, and other applications, services, processes, systems, engines, or functionality not discussed in detail herein. The concept search application 115 may be executed to encode for rendering by the client 106 at least one network page including a ranked list of at least a portion of a pool of items generated in response to a search query and a search context, where the ranked list includes a navigational aid. The search profiling service 118 may be executed to generate search profiling information from various data sources. In various embodiments, the concept search application 115 and the search profiling service 118 may comprise a single application or any number of other applications.

The data stored in the data store 112 may include, for example, item data 121, item sales data 124, concept data 127, taxonomy data 130, page view data 133, item behavior data 136, concept behavior data 139, and/or potentially other data. The item data 121 may include, for example, item titles, item images, item descriptions, item prices, item quantities, item reviews, item concepts, related items, accessory items, compatible parts for that item, and/or any other data that may be used to describe or otherwise relate to items that are searchable by the concept search application 115. The item sales data 124 may include data describing the quantity of sales of particular items. In some embodiments, the item sales data 124 may include customer order data. The customer order data may be collected from individual customers and then aggregated. The page view data 133 describes a quantity of page views associated with network pages that describe particular items. Such network pages may include, for example, item detail pages, concept pages that include descriptions or listings of items, and/or any other network pages that can be associated with particular items. In some embodiments, the page view data 133 may include statistics generated from network page server log data, where these statistics directly indicate the number of page views associated with each respective item. In other embodiments, the page view data 133 may include the actual log data generated by the network page server application, which may comprise the concept search application 115.

The taxonomy data 130 may comprise data describing one or more logical taxonomies for classifying items. A dimension is an aspect of an item that can be classified. Each taxonomy is a way to classify items within a particular dimension. Each taxonomy described in the taxonomy data 130 may be characterized, for example, by a hierarchical data structure such as a tree. Thus, a taxonomy may be said to have a plurality of nodes, where each node may link to a plurality of child nodes, each of which may in turn link to further child nodes. A starting point in a taxonomy may be called a root node, while nodes having no child nodes are said to be leaf nodes. Child nodes, grandchild nodes, etc., of a root node may also be called descendants of the root node. Each node described within the taxonomy data 130 may be thought of as a predefined way in which items relate to one another. Each top-level node may be thought of as a main concept, and each successive child node may be thought of as a concept that is subordinate to a parent concept and which more specifically defines a relationship among items. It is further understood that an item may be associated with a plurality of concepts and/or a plurality of taxonomies as desired.

As noted earlier, a taxonomy classifies items within a particular dimension. One example of a dimension is category, and one type of taxonomy classifies items according to a set of common recognizable characteristics of the category. As one example, all items in the "Electronics" category share a set of characteristics which allows these items to be recognized as "Electronics." In some embodiments, these categories correspond to departments of an online retailer, for example, books, digital downloads, electronics, and other departments. Each of the departments, or top-level nodes, is associated with a plurality of items. A top-level node associated with digital downloads in the taxonomy may be associated with child nodes including, for example, video downloads, MP3 downloads, game downloads, and/or other digital downloads. Each of these child nodes may be further subdivided if necessary. For example, the MP3 downloads subordinate node may be further subdivided by genre, such as classical, alternative rock, country, hip-hop, and so on. Ultimately, a leaf node, or lowest-level node, is associated with one or more items.

In another type of taxonomy, items which share an aspect are grouped together. As a non-limiting example, a root node of a taxonomy in the taxonomy data 130 may describe image resolution. Each of the top-level nodes is associated with a plurality of items. A top-level node for an image resolution of 1024×768 is associated with child nodes for items having the resolution 1024×768, while a top-level node for an image resolution of 1920×1200 is associated with child nodes for items having the resolution 1920×1200.

The item behavior data 136 may include various information that describes past behavior, across multiple users, with respect to searching and/or browsing for items. Such information may be aggregated and indexed for each particular item. Thus, the item behavior data 136 may comprise data describing the association between particular search queries and particular items. Similarly, the concept behavior data 139 may comprise data describing the association between particular search queries and particular concepts. The item behavior data 136 and the concept behavior data 139 may be generated, for example, by the search profiling service 118 or another application from a plurality of previous search queries, the item sales data 124, the page view data 133, and/or other data.

The client 106 is representative of a plurality of client devices that may be coupled to the network 109. The client 106 may comprise, for example, a processor-based system such as a computer system. Such a computer system may be embodied in the form of a desktop computer, a laptop computer, a personal digital assistant, a cellular telephone, a set-top box, a music player, a web pad, a tablet computer system, a gaming console, or other devices with like capability.

The client 106 may be configured to execute various applications such as a browser 142 and/or other applications. The browser 142 may be executed in a client 106, for example, to access and render network pages, such as web pages, or other network content served up by the client 106 and/or other servers. The client 106 may be configured to execute applications beyond the browser 142 such as, for example, email applications, instant message applications, and/or other applications.

Next, a general description of the operation of the various components of the networked environment 100 is provided. To begin, the search profiling service 118 may be executed periodically, or in response to some other trigger, in order to generate item behavior data 136, concept behavior data 139, and/or other data. It is understood that the data generation and analysis functions of the search profiling service 118 may be implemented within the concept search application 115 or some other application.

As users enter search queries and browse through search results, the search profiling service 118 captures within the item behavior data 136 the search queries and associated navigation actions that led users to particular items. The occurrence of more instances of a user reaching a particular item through a particular query leads to a stronger association between the query and the item. Similarly, the search profiling service 118 captures within concept behavior data 139 the search queries, and associated navigation actions, that led users to particular concepts. In this manner, item behavior data 136 describes the relevance of particular items in connection with particular search queries and the concept behavior data 139 describes the relevance of particular concepts in connection with particular search queries. As a non-limiting example, an item search using a particular search query and/or search context may return a list of items. When users select an item from the list of items, that item may be deemed more relevant to, or having a stronger association with, that particular search query and/or search context than the other items. When users take a further action such as, for example, ordering the item, viewing a network page associated with the item, ordering a related item, etc., the item may be considered even more relevant.

A user at a client 106 may access a network page from the concept search application 115 on the computing device 103. It is understood that the network page may be provided instead by some other network page server application executing on the computing device 103. The network page may include a form for inputting a search query from the user to the concept search application 115. To this end, the browser 142 may render, for example, a type of form input field (text, text area, etc.), a search button, and or other form components. The user may input the search query into the input field in the network page rendered by the browser 142 and then submit the search query to the concept search application 115.

In response to the search query, the concept search application 115 generates a pool of concepts. The pool of concepts may be selected from the data store 112 by performing a relevance-based query across various attributes. These attributes may include the concept data 127 (e.g., concept name, items in a concept, etc.), the item data 121 (e.g., title, description, etc.), the item behavior data 136, and the concept behavior data 139. As noted above, the item behavior data 136 and the concept behavior data 139 describe the degree of relevance for particular search queries to particular items and concepts, respectively. As can be appreciated, the data returned by the search query is a combination of concept metadata and items within those concepts.

The concept search application 115 processes the initial pool of concepts that match the search query to produce a pool of matching concepts that are deemed to be the most relevant. These most relevant concepts, and items within those concepts, are returned as the search results. The concept search application 115 may determine relevance by selecting those concepts in the pool that meet a relevance threshold, where this relevance threshold is not a predetermined value, but is instead set dynamically as the point at which relevance scores for concepts in the pool begin to significantly decline. In this manner, the concept search application 115 excludes from the search results those items in the pool that have a relevance score that is less than this dynamically determined drop-off.

Having determined the most relevant concepts, the concept search application 115 uses the concept data 127 to group the results by concept. The concept search application 115 generates at least one network page that includes an enhanced concept list in conjunction with items in the search results, where the enhanced concept list includes concepts at multiple levels of a taxonomy. As noted above, each one of the relevant top-level concepts and relevant subordinate concepts corresponds to a node in the taxonomy data 130. The concept search application 115 then sends the one or more network pages over the network 109 to the client 106. A browser 142 or other application executing on the client 106 then renders the one or more of the network pages for display to a user.

As a non-limiting example, the enhanced concept list may be rendered as a set of links to various network pages. At least some of these linked network pages correspond to subsequent views of the search results that are limited to relevant items in a respective selected concept. The text of a link may be the title of the concept. The ordering of the links rendered within the enhanced concept list may be based on the relevance of the corresponding concept. As a non-limiting example, the more relevant concept nodes may be represented by links nearer to the top of the enhanced concept list. Alternatively, or additionally, the more relevant concepts may have links rendered in a larger font, in bold text, and/or with another form of emphasis. In addition to these dynamic links, the enhanced concept list may include static text labels rather than links for concepts.

Figure 2:
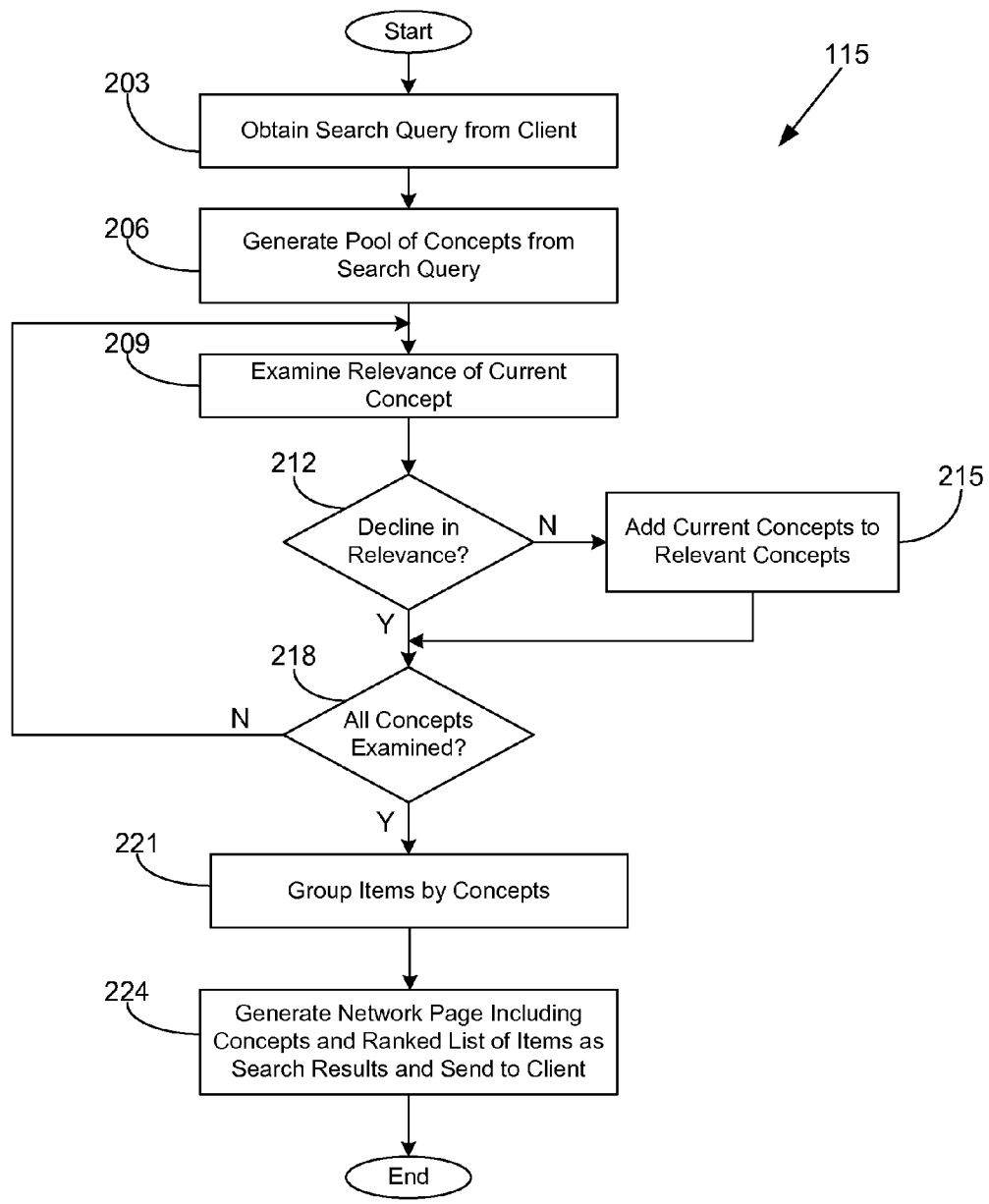
FIG. 2 is a flowchart illustrating one example of functionality implemented as portions of an item search application executed in a computing device in the networked environment of FIG. 1 according to various embodiments of the present disclosure.

Referring next to FIG. 2, shown is a flowchart that provides one example of the operation of a portion of the concept search application 115 according to various embodiments. It is understood that the flowchart of FIG. 2 provides merely an example of the many different types of functional arrangements that may be employed to implement the operation of the portion of the concept search application 115 as described herein. As an alternative, the flowchart of FIG. 2 may be viewed as depicting an example of steps of a method implemented in the computing device 103 (FIG. 1) according to one or more embodiments.

Beginning with box 203, the concept search application 115 obtains a search query from a client 106 (FIG. 1) over the network 109 (FIG. 1). For example, the search query may be entered in a text form within a browser 142 (FIG. 1) executing on the client 106 or by some other method. As a non-limiting example, the search query may be transmitted from the client 106 to the concept search application 115 by way of a hypertext transfer protocol (HTTP) GET, POST, PUT, and/or other request.

In box 206, the concept search application 115 generates a pool of concepts based at least in part on the search query. As described above, concepts in the pool may be selected based at least in part on the relevance of the concepts to the search query. The factors used in determining relevance may include concept data 127 (e.g., concept name, items in a concept, etc.), item data 121 (e.g., title, description, etc.), the item behavior data 136, and the concept behavior data 139. The concepts in the pool generated by the query are ranked based on a relevance score.

Starting with the concept having the highest relevance score, in box 209 the concept search application 115 examines the relevance score of the current concept in the pool. In box 212, the concept search application 115 determines whether the relevance score of the current concept is significantly less than the relevance score of the previous item. In this manner, the concept search application 115 determines whether the current concept presents a steep decline in relevance. If the concept search application 115 determines in box 212 that the relevance score of the current concept does not present a steep decline, the concept search application 115 proceeds to box 215 and adds the current concept into a list of relevant concepts. As can be appreciated, the current concept in the pool is a combination of concept metadata and items within those concepts.

After adding to the list of relevant concepts, the concept search application 115 proceeds to box 218 and determines whether all concepts in the pool have been examined for relevance. If box 218 determines that all concepts have not been examined, then the concept search application 115 returns to box 209 to process the next concept. Otherwise, if box 218 determines that all concepts have been examined, then the concept search application 115 moves to box 221 as discussed below.

Having considered the actions taken if the current concept does not have a steep decline in relevance, if instead the concept search application 115 determines at box 212 that the current concept does have a steep decline in relevance, the concept search application 115 proceeds to box 218. In box 218, the concept search application 115 determines whether all concepts have been examined for relevance. If box 218 determines that all concepts have been examined, then the concept search application 115 moves to box 221.

As noted above, the concepts within the relevant concept list are a combination of concept metadata and items within those concepts. At box 221, the concept search application 115 groups the items by concept (e.g., toy items with other toy items) for eventual presentation to the user and proceeds to box 224, where the concept search application 115 generates a network page including the list of items for a particular relevant concept as search results. This particular concept may correspond to the concept containing the largest number of relevant items, or may correspond to a default concept. The generated network page also includes the enhanced concept list, where the enhanced concept list includes both relevant concepts and relevant subordinate concepts. Advantageously, the relevant items returned as search results span across different subordinate concepts of the same top-level concept.

Thus, as a non-limiting example, the user is presented with search results including instances of copy paper, printer paper, and spiral-bound notebooks. These items all belong to the same top-level concept ("Office Supplies") but to different subordinate concepts ("Copy Paper," "Printer Paper," and "Composition Notebooks"). Because the user views particular items in concepts at various levels along with the enhanced concept list, the user can better appreciate the relevance of the respective concepts, and may therefore be more inclined to explore the concepts. As one non-limiting example, a user that is presented with a book of paper dolls in the item search results along with the subordinate concept "Kid's Drawing Books" may better appreciate the relevance of the main concept "Toys and Crafts." The user may then be more inclined to explore other subordinate concepts such as "Preschool Art Toys" and "Kids' Art Paints," which might not otherwise appear relevant to the search query of "paper."

It may be said that the concept search application 115 encodes the network page for rendering by the browser 142. Thereafter, the concept search application 115 sends the one or more network pages to the client 106 by way of the network 109. The concept search application 115 then ends.

Figure 3A:
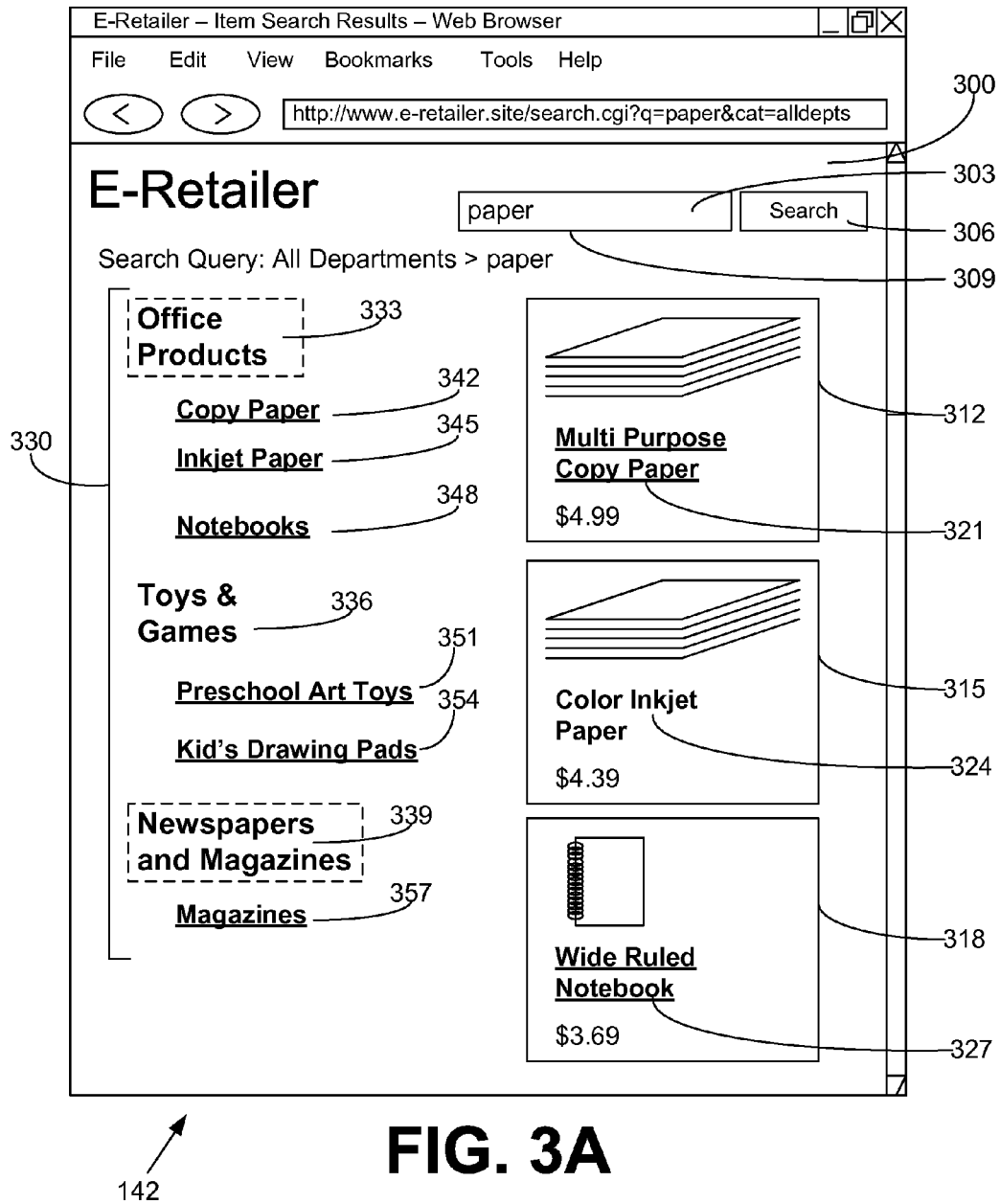
FIGS. 3A and 3B are drawings of example user interfaces rendered by a client in the networked environment of FIG. 1 according to various embodiments of the present disclosure.

Turning now to FIG. 3A, shown is a drawing of an example of a user interface 300 rendered by a browser 142 executing on a client 106 (FIG. 1) in the networked environment 100 (FIG. 1) according to various embodiments of the present disclosure. As shown, the user interface 300 represents a network page rendered by the browser 142 for display to a user. In this embodiment, a concept search application 115 (FIG. 1) is deployed for an online retailer. However, it is understood that a concept search application 115 may be deployed for many different purposes.

In this example, a user has entered the search term "paper" within a search query entry field 303 and has executed an item search by clicking on a search button 306 from a previously presented network page. It is understood, however, that a search query may be entered in a variety of ways such as, for example, by clicking on a link, by depressing a key on a keyboard, and/or by other methods. In particular, the search button 306 may be optional, and a user may send a search query to the concept search application 115 (FIG. 1) merely by hitting an enter key on a keyboard associated with the client 106. In various embodiments, the search query entry field 303 and the search button 306 may be absent from the user interface 300.

As shown, the search term "paper" is rendered within a label 309 immediately above item search results 312, 315, 318. The label 309, in addition to displaying the search term, also indicates the search context. In this case, the search context comprises "All Departments." As non-limiting examples, the search context may instead be books, digital downloads, electronics, foods, or any other concept within a taxonomy in the taxonomy data 130. In various embodiments, the search context may be selectable through a drop-down box or through other means. The label 309 is provided merely as an example and may not be present in various embodiments. In various embodiments, the item search results 312, 315, 318 may be rendered with more detail or less detail than that shown in FIG. 3. As a non-limiting example, in one embodiment, the item search results 312, 315, 318 may include images only.

Turning now to the item search results 312, 315, 318, the concept search application 115 preselects the top-level concept 333 ("Office Products") as the most relevant top-level concept, and presents the search results 312, 315, 318 found in that top-level concept 333. The first item search result 312 has an item title 321 of "Multi Purpose Copy Paper," the second item search result 315 has an item title 324 of "Color Inkjet Paper," and the third item search result 318 has an item title 327 "Wide Ruled Notebook." These items all belong to the same top-level concept ("Office Supplies") but to different subordinate concepts ("Copy Paper," "Printer Paper," and "Composition Notebooks").

Along with the item search results 312, 315, 318, the user interface 300 also includes an enhanced concept list 330. The enhanced concept list 330 includes both relevant top-level concepts 333, 336, 339 and relevant subordinate concepts 342, 345, 348, 351, 354, 357. The number of relevant top-level concepts 333, 336, 339 and the number of relevant subordinate concepts 339, 342, 345, 348, 351, 354, 357 are both dynamic, based on the number of items that concept search application 115 has deemed relevant according to a drop-off criteria described earlier in connection with FIG. 2.

In this non-limiting example, the relevant top-level concepts 333, 336, 339 in the enhanced concept list 330 correspond to "Office Supplies," "Toys and Games," and "Newspapers and Magazines." In this non-limiting example, user interaction with each of the top-level concepts 333, 336, 339 acts to filter the search results to include only those items within the respective relevant top-level concept 333, 336, 339 thus limiting or narrowing the view of the search results. This allows the user to easily explore the relevant items in that top-level concept 333, 336, 339.

Returning to the enhanced concept list 330, the relevant subordinate concepts located within the top-level concept 333 are subordinate concept 342 (corresponding to "Copy Paper"), subordinate concept 345 (corresponding to "Inkjet Paper"), and subordinate concept 348 (corresponding to "Notebooks"). The relevant subordinate concepts located within the top-level concept 336 are subordinate concept 351 (corresponding to "Preschool Art Toys"), and subordinate concept 354 (corresponding to "Kids' Drawing Pads"). The relevant subordinate concept located with the top-level concept 339 is subordinate concept 357 (corresponding to "Newspapers and Magazines"). In this non-limiting example, user interaction with each of subordinate concepts 342, 345, 348, 351, 354, 357 acts to filter the search results to include only those items within the respective relevant subordinate concept 342, 345, 348, 351, 354, 357 thus limiting or narrowing the view of the search results. This allows the user to easily explore the relevant items in that subordinate concept 342, 345, 348, 351, 354, 357. In addition, the presentation of relevant items along with the relevant subordinate concepts 342, 345, 348, 351, 354, 357 in the enhanced concept list 330 reminds the user why those subordinate concepts are relevant.

Figure 3B:
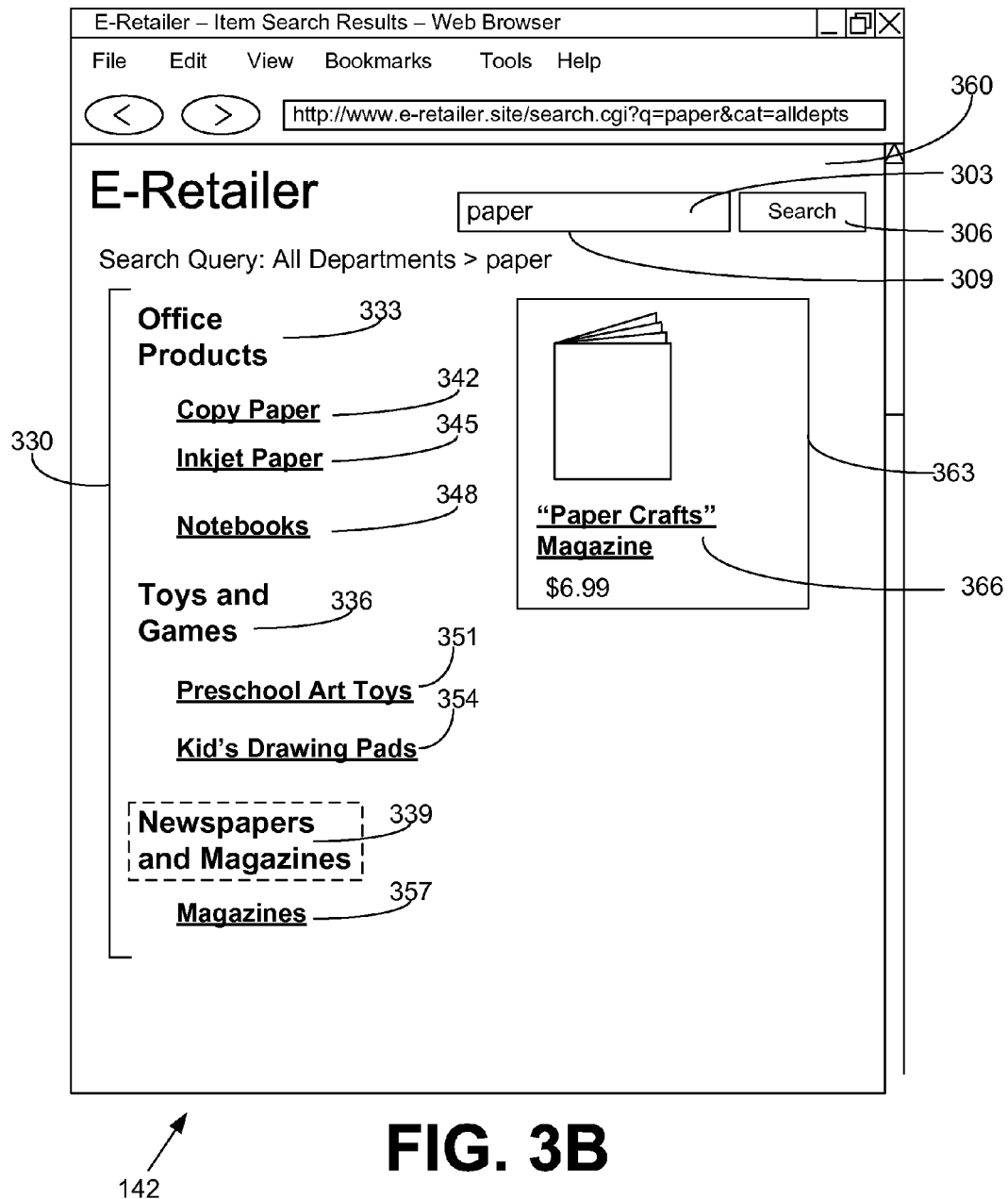

As described above, the user interface 300 in FIG. 3A is rendered upon a search query for "paper," at which time the concept search application 115 preselects the most relevant top-level concept 333 ("Office Products") and presents the search results 312, 315, 318 found in that top-level concept 333. Referring next to FIG. 3B, shown is a drawing of an example of a user interface 360 rendered when a user viewing those initially viewed search results next selects subordinate concept 339 ("Newspapers and Magazines"). The user interface 303 is rendered by a browser 142 executing on a client 106 (FIG. 1) in the networked environment 100 (FIG. 1) according to various embodiments of the present disclosure. As shown, the user interface 360 represents a network page rendered by the browser 142 for display to a user. In this embodiment, a concept search application 115 (FIG. 1) is deployed for an online retailer. However, it is understood that a concept search application 115 may be deployed for many different purposes.

The user interface 360 includes elements similar to the user interface 303 in FIG. 3B, specifically, a search query entry field 303, a search button 306, and a search context label 309. As with FIG. 3A, the search results reflect a search using the search query of "paper." However, in the user interface 360, the user has selected the subordinate concept 339 ("Newspapers and Magazines") to view the item search results in this subordinate concept, namely, item search result 363. The item search result 363 has an item title 366 ("Paper Crafts Magazine"). Having viewed as a search result the magazine with "Paper" in the title, the user is better able to appreciate the relevance of the subordinate concept "Newspapers and Magazines" to the search query of "paper."

In summary, the inclusion of the enhanced concept list 330 in conjunction with the item search results 312, 315, 318 provides an authoritative browsing experience for the user. To this end, a user who entered the search query of "paper" is presented with subordinate concept information along with item search results 312, 315, 318. This simultaneous presentation of information allows the user to better understand the relevance of the search results.

As noted above, the concept search application 115 preselects a particular top-level concept as the most relevant top-level concept, and presents the search results found in that top-level concept, which advantageously saves the user the step of selecting a top-level concept for viewing. In the examples shown above, the concept search application 115 deals with the single dimension of category or store, and thus preselects the most relevant concept using that single dimension. In other embodiments (not shown), the concept search application 115 translates a concept into multiple dimensions, which advantageously saves the user additional selection steps. As a non-limiting example, a user may provide the search query of "gold rings," and in response the concept search application determines not only the most relevant node using the store dimension (i.e., "Jewelry"), but additionally determines the most relevant node using additional dimensions (i.e., "Metal Type"). In this manner, the concept search application 115 selects the most relevant item search results for multiple dimensions. As described above, the relevance is determined using the item behavior data 136, and the concept behavior data 139.

Figure 4:
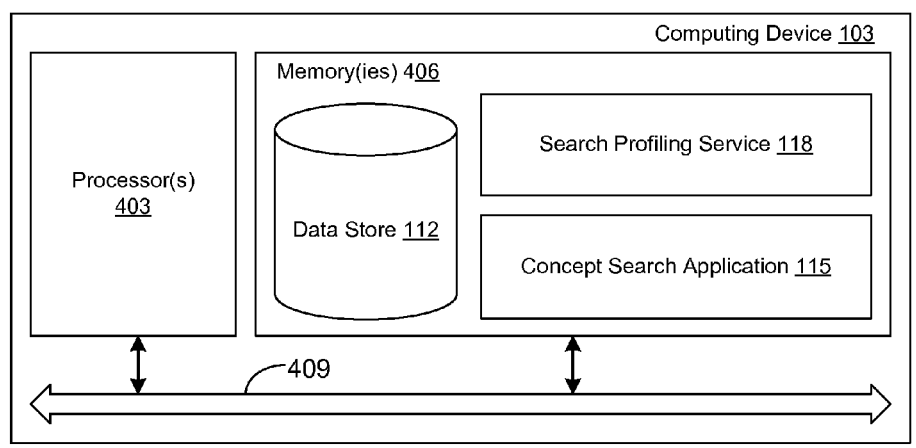
FIG. 4 is a schematic block diagram that provides one example illustration of a computing device employed in the networked environment of FIG. 1 according to various embodiments of the present disclosure.

With reference to FIG. 4, shown is a schematic block diagram of the computing device 103 according to an embodiment of the present disclosure. The computing device 103 includes at least one processor circuit, for example, having a processor 403 and a memory 406, both of which are coupled to a local interface 409. To this end, the computing device 103 may comprise, for example, at least one server computer or like device. The local interface 409 may comprise, for example, a data bus with an accompanying address/control bus or other bus structure as can be appreciated.

Stored in the memory 406 are both data and several components that are executable by the processor 403 in particular, stored in the memory 406 and executable by the processor 403 are the concept search application 115, the search profiling service 118, and potentially other applications. Also stored in the memory 406 may be a data store 112 and other data. In addition, an operating system may be stored in the memory 406 and executable by the processor 403.

It is understood that there may be other applications that are stored in the memory 406 and are executable by the processor 403 as can be appreciated. Where any component discussed herein is implemented in the form of software, any one of a number of programming languages may be employed such as, for example, C, C++, C#, Objective C, Java, JavaScript, Perl, PHP, Visual Basic, Python, Ruby, Delphi, Flash, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as including both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403 may represent multiple processors 403 and the memory 406 may represent multiple memories 406 that operate in parallel processing circuits, respectively. In such a case, the local interface 409 may be an appropriate network 109 (FIG. 1) that facilitates communication between any two of the multiple processors 403, between any processor 403 and any of the memories 406, or between any two of the memories 406, etc. The local interface 409 may comprise additional systems designed to coordinate this communication, including, for example, performing load balancing. The processor 403 may be of electrical or of some other available construction.

Although item search application 115, search profiling service 118, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 2 shows the functionality and operation of an implementation of portions of the item search application 115. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 403 in a computer system or other system. The machine code may be converted from the source code, etc. If embodied in hardware, each block may represent a circuit or a number of interconnected circuits to implement the specified logical function(s).

Although the flowchart of FIG. 2 shows a specific order of execution, it is understood that the order of execution may differ from that which is depicted. For example, the order of execution of two or more blocks may be scrambled relative to the order shown. Also, two or more blocks shown in succession in flowchart of FIG. 2 may be executed concurrently or with partial concurrence. Further, in some embodiments, one or more of the blocks shown in FIG. 2 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including item search application 115 and search profiling service 118, that comprises software or code can be embodied in any non-transitory computer-readable medium for use by or in connection with an instruction execution system such as, for example, a processor 403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium storing a program executable in a computing device, the program comprising:
   code that generates search profile data from information including a plurality of previous search queries, page view data, and product sales data;
   code that inputs a search query from a client;
   code that generates a pool of concepts in response to the search query;
   code that determines, based at least in part on the search profile data, a plurality of relevant concepts within the pool of concepts that are relevant to the search query by selecting, from the pool of concepts, a first portion of the pool of concepts meeting or exceeding a relevance threshold or by excluding, from the pool of concepts, a second portion of the pool of concepts falling below the relevance threshold, the relevance threshold being dynamically determined as a function of a significant decline in relevance, the relevant concepts existing at varying levels of a taxonomy;
   code that generates a concept list corresponding to the plurality of relevant concepts;
   code that generates at least one network page including the concept list and at least a portion of a plurality of products, the plurality of products being responsive to the search query;
   code that sends the at least one network page to the client, individual ones of the relevant concepts in the concept list operating to limit a view of the plurality of products to those of the products located in a respective relevant concept; and
   wherein the product sales data comprises at least one of data describing a quantity of sales of one of the products or customer order data.

2. A method, comprising:
   generating, in a computing device, search profile data based at least in part on item sales data;
   generating, in the computing device, a pool of concepts in response to a search query as a function of the search profile data;
   determining a plurality of relevant concepts that are relevant to the search query by selecting, from the pool of concepts, a first portion of the pool of concepts meeting or exceeding a relevance threshold or by excluding, from the pool of concepts, a second portion of the pool of concepts falling below the relevance threshold, the relevance threshold being dynamically determined as a function of a significant decline in relevance;
   encoding for rendering by a client at least one network page including a concept list and at least a portion of a plurality of items, the plurality of items being responsive to the search query, the concept list corresponding to the plurality of relevant concepts, individual ones of the relevant concepts in the concept list operating to limit a view of the plurality of items to those of the items located in a respective relevant concept; and
   wherein the item sales data comprises at least one of data describing a quantity of sales of one of the items or a customer order data.

3. The method of claim 2, the method further comprising determining the plurality of relevant concepts based at least on concept factors, item factors, and behavior factors.

4. The method of claim 2, the method further comprising determining the plurality of items by performing a relevance-based search query across concept attributes, item attributes, and behavior attributes.

5. The method of claim 2, wherein the at least a portion of the items included in the at least one network page corresponds to one of the plurality of relevant concepts that includes a largest number of items.

6. The method of claim 2, wherein the at least a portion of the items included in the network page are associated with the relevant concepts.

7. The method of claim 2, wherein the search profile data is based at least in part on a plurality of previous search queries.

8. The method of claim 2, wherein the search profile data is based at least in part on page view data.

9. A system, comprising:
a computing device; and
a concept search application executable in the computing device, the concept search application comprising:
logic that generates a search profile data based at least in part on item sales data;
logic that determines a plurality of relevant concepts that are relevant to a search query as a function of the search profile data by selecting, from a pool of concepts, a first portion of the pool of concepts meeting or exceeding a relevance threshold or by excluding, from the pool of concepts, a second portion of the pool of concepts falling below the relevance threshold, the relevance threshold being dynamically determined as a function of a significant decline in relevance, the relevant concepts existing at varying levels of a taxonomy;
logic that generates a concept list corresponding to the plurality of relevant concepts; and
logic that produces at least one network page including the concept list and at least a portion of a plurality of items, the plurality of items being responsive to the search query, individual ones of the relevant concepts in the concept list operating to limit a view of the plurality of items to those of the items located in a respective relevant concept.

10. The system of claim 9, wherein the concept list includes one of the plurality of relevant concepts that includes a largest number of items.

11. The system of claim 9, wherein the at least a portion of the items included in the at least one network page are not constrained by the relevant concepts.

12. The system of claim 9, wherein the at least a portion of the items included in the at least one network page are associated with the relevant concepts.

13. The system of claim 9, wherein the concept search application further comprises logic that determines the plurality of relevant concepts based at least on concept factors, item factors, and behavior factors.

14. The system of claim 9, wherein the concept search application further comprises logic that determines the plurality of relevant concepts by performing a relevance-based search query across concept attributes, item attributes, and behavior attributes.

15. The system of claim 9, wherein the at least a portion of the items included in the at least one network page corresponds to one of the plurality of relevant concepts that includes a largest number of items.

16. The system of claim 9, wherein the at least a portion of the items included in the at least one network page corresponds to a default concept.

17. The system of claim 9,
wherein the search profile data is based at least in part on a plurality of previous search queries.

18. The system of claim 9,
wherein the search profile data is based at least in part on page view data.

19. The system of claim 9, wherein the item sales data comprises at least one of data describing a quantity of sales of one of the items or a customer order data.

20. The method of claim 2, wherein the at least a portion of the plurality of items included in the at least one network page corresponds to a default concept.

21. The method of claim 2, wherein the at least a portion of the plurality items included in the at least one network page are unconstrained by the plurality of relevant concepts.

22. The method of claim 2, wherein the portion of the plurality of concepts included in the at least one network page corresponds to a one of the plurality of relevant concepts that includes a largest number of items.

23. The system of claim 9, wherein the concept search application further comprises logic that generates the pool of concepts based at least in part on the search profile data.

* * * * *